United States Patent [19]

Singh

[11] Patent Number: 4,856,023
[45] Date of Patent: Aug. 8, 1989

[54] SYSTEM FOR MAINTAINING LOW BIT ERROR RATE IN A STARCOUPLED NETWORK OF DIRECT COUPLED STATIONS

[75] Inventor: Amar J. Singh, Escondido, Calif.

[73] Assignee: NCR Corporation, Dayton, Ohio

[21] Appl. No.: 888,607

[22] Filed: Jul. 23, 1986

[51] Int. Cl.$^4$ .................... H04B 3/36; H04L 25/20
[52] U.S. Cl. ................................... 375/3; 375/36; 330/297
[58] Field of Search .................. 375/3, 36; 330/296, 330/297; 370/85; 340/825.02

[56] References Cited

U.S. PATENT DOCUMENTS

| | | | |
|---|---|---|---|
| 3,633,165 | 1/1972 | Gilbert | 370/85 |
| 3,827,026 | 7/1974 | Viswanathan | 375/36 |
| 3,855,419 | 12/1974 | Hurford | 370/85 |
| 4,417,334 | 11/1983 | Gunderson et al. | 340/825.01 |
| 4,507,793 | 5/1985 | Adams | 375/36 |
| 4,561,091 | 12/1985 | Scholl et al. | 370/93 |
| 4,569,059 | 2/1986 | Fish | 375/36 |

Primary Examiner—Robert L. Griffin
Assistant Examiner—Andrew J. Telesz, Jr.
Attorney, Agent, or Firm—Wilbert Hawk, Jr.; Stephen F. Jewett

[57] ABSTRACT

A data process system has a plurality of stations or terminals linked to a star coupler over cables comprising separate sending and receiving transmission lines, the cable shield being connected to system ground. To minimize bit error rate when a station is powered down, the transmitting differential amplifier at each terminal station is connected between a bias voltage and a virtual ground created by a pair of diodes connected in parallel, their anodes being connected to a voltage source through a current limiting resistor, the cathode of one diode being connected to system ground, the cathode of the other diode being connected to one side of the transmitting amplifier to define the virtual ground. To further enhance noise rejection, a balanced differential network is connected to the outputs of a transistor pair at the amplifier output to the differential wire transmission line. The network comprises a resistor and diode connected in series between each transistor's emitter output and the amplifier bias voltage source, the combined resistance and dynamic impedance of each portion of the balanced differential network being equal. At the receiver end of the star coupler cabinet, a series resistor network is coupled from a bias voltage source for a differential receiver amplifier to the system ground. The receiver amplifier has two input transistors; the resistor network includes a resistor coupled across the transistor inputs of a resistance matched to the characteristic impedance of the cable; two additional resistors are connected in series between the ends of this resistor and the inputs to the amplifier transistors to define a relatively high offset voltage across the input to the receiver amplifier.

11 Claims, 3 Drawing Sheets

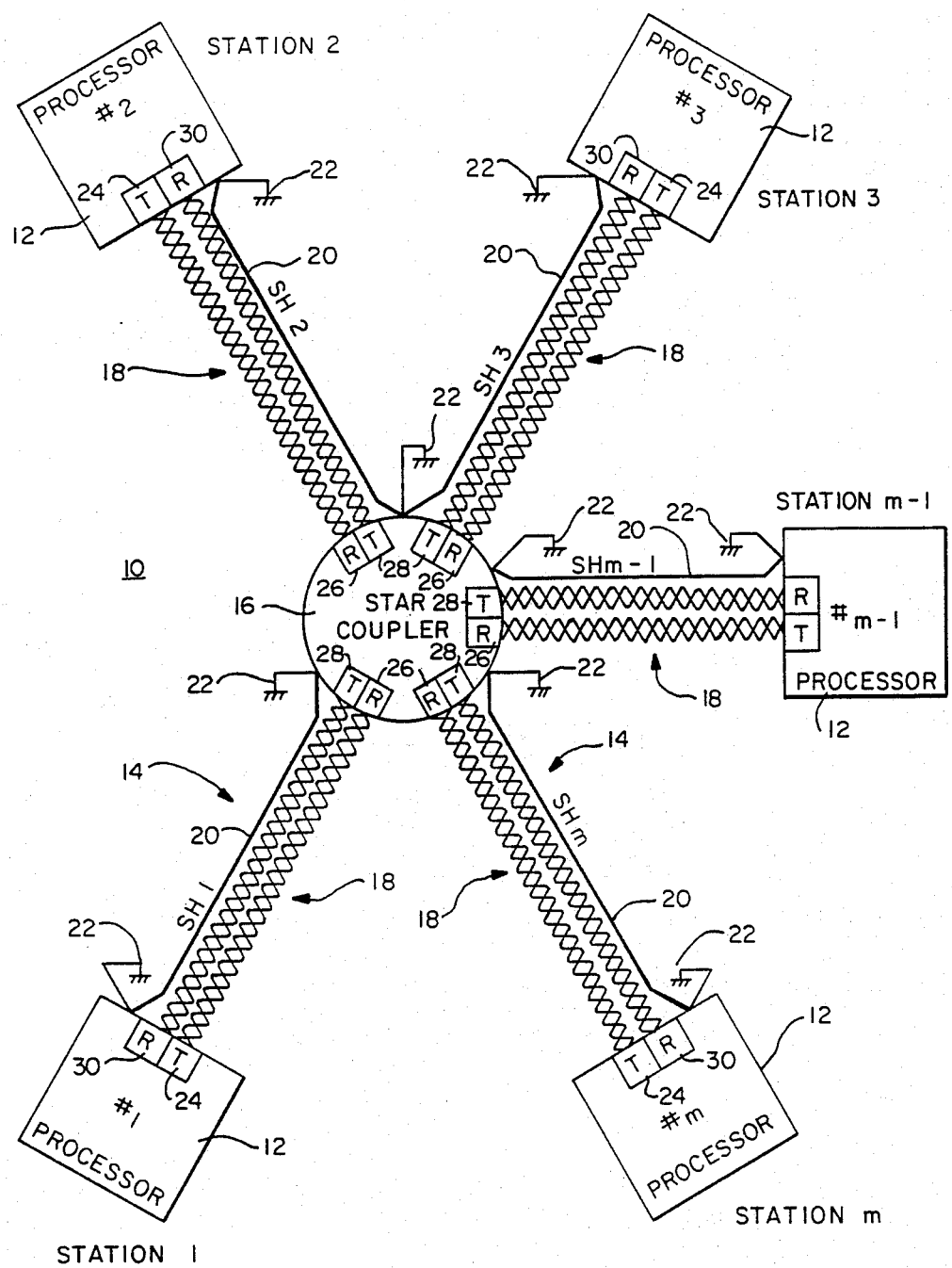
FIG.—1

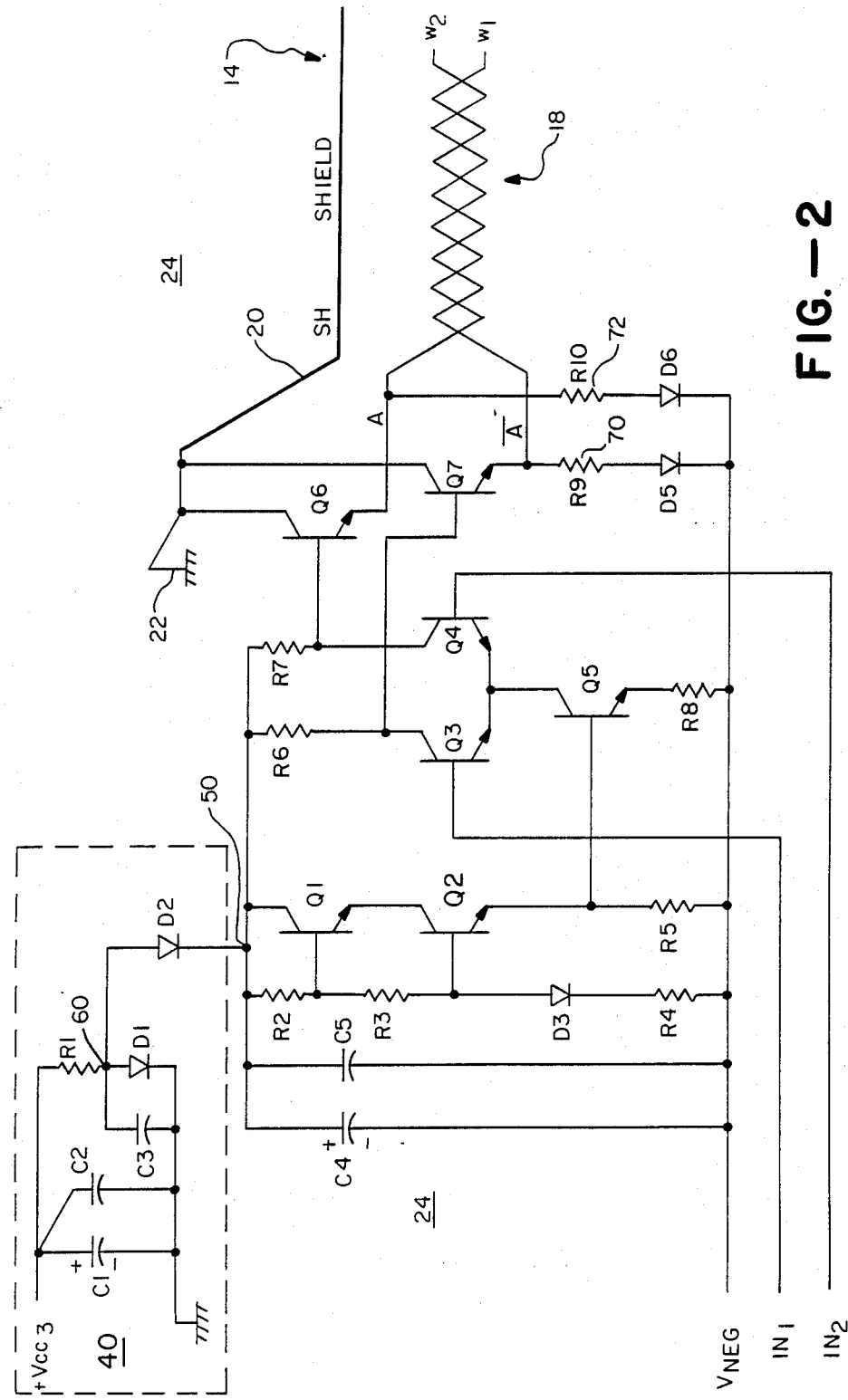
FIG.—2

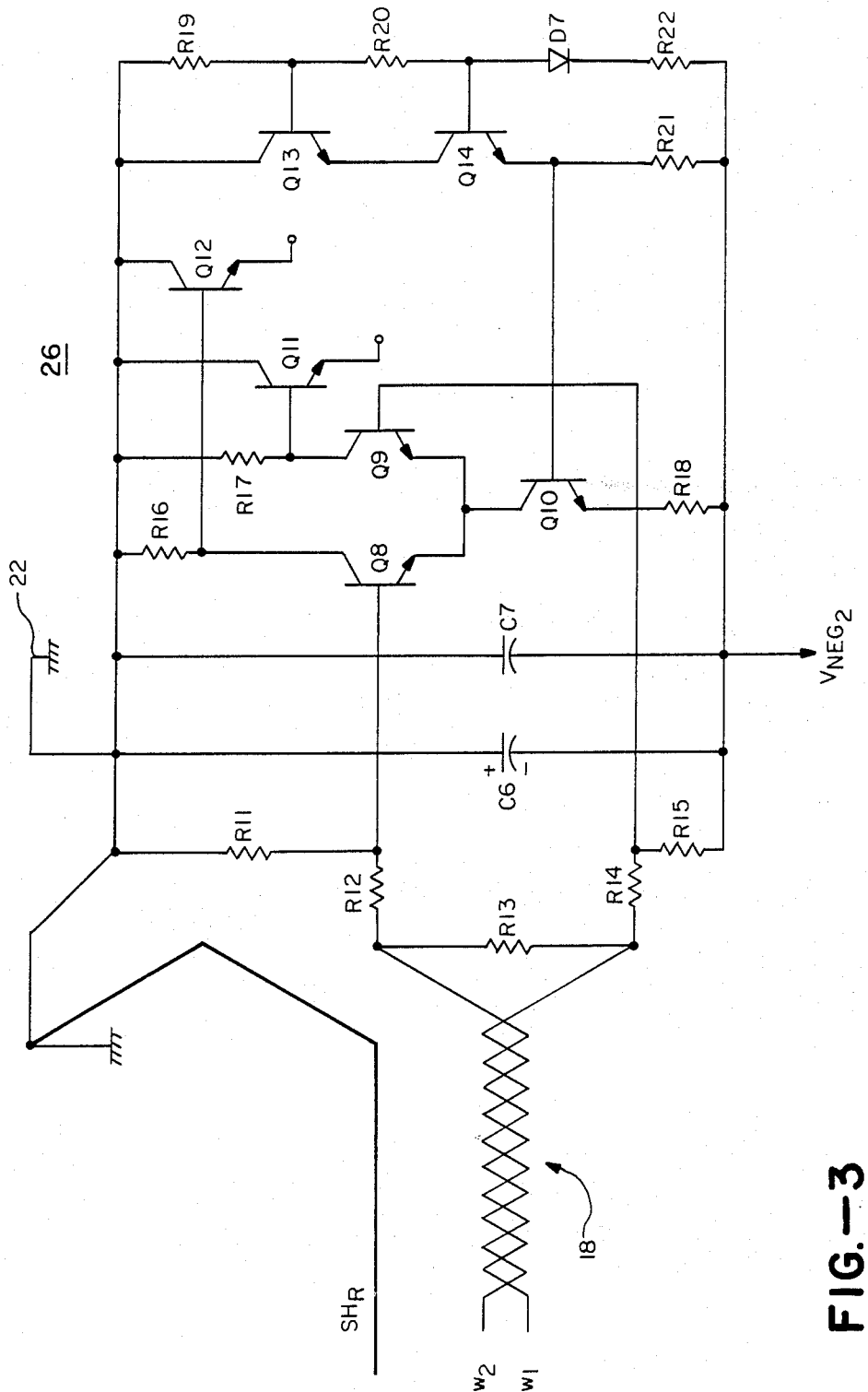
FIG.—3

SYSTEM FOR MAINTAINING LOW BIT ERROR RATE IN A STARCOUPLED NETWORK OF DIRECT COUPLED STATIONS

BACKGROUND OF THE INVENTION

This invention relates to data processing systems, and particularly to data processing systems of the type having a plurality of subsystems linked by a star coupler.

Star couplers are well known in data processing technology. Systems employing star couplers are described, for example, in Metcalf & Boggs, "Ethernet: Distributed Packet Switching for Local Computer Networks," 19 Communications of the ACM 395 (July, 1976); Rawson & Metcalf, "Fibernet: Multimode Optical Fibers for Local Computer Networks," 26 IEEE Transactions on Communications, 983 (July, 1978); Data processing System Having Dual Channel System Bus, Gunderson, et al. U.S. Pat. No. 4,417,334, Nov. 22, 1983; and Data Processing Subsystem Wherein At Least One Subsystem Has a Local Memory and a Mailbox Memory within the Local Memory for Storing Header Information, U.S. Pat. No. 4,387,441, Kocol, et al., June 7, 1983.

The latter two patents are assigned to the Assignee of this invention. The present invention is usable in the systems disclosed in these patents, which are incorporated herein by reference.

When used in a data processing system having a plurality of stations or terminals, a star coupler is typically connected to pairs of transmission lines, with one pair associated with each subsystem. A first transmission line of the pair carries signals away from the subsystem to the star coupler, and a second transmission line of the pair carries signals from the star coupler to the subsystem. (It should be noted that each transmission "line" comprises a twisted pair of wires for differential signal transmission.) When any subsystem transmits or generates a signal or message, that message is received by the star coupler from the first transmission line associated with the subsystem and is directed or passed to every subsystem by way of each second transmission line, including the second transmission line returning to the subsystem that transmitted the message. This of course offers advantages in linking multiple subsystems, since a subsystem transmitting a message receives back the message at the same time each of the other subsystems receives the message. The transmitting system can therefore check for any transmission errors, without requiring a receiving subsystem to regenerate the message.

The function of the star coupler is essentially to take all the signals received on the input side of the coupler on the first transmission lines, to logically OR all these first transmission line signals, and to redrive the resulting signal to all terminals or subsystems over the second transmission line of each pair.

A potentially serious problem resides in the use of a star coupler in this mode to logically OR all the incoming signals on the first transmission line. If the incoming data from any transmission line suffers from a high bit error rate, these errors can be quickly propagated throughout the system. This is especially true where noise is picked up from one system and its associated transmission line.

It has been found that communication may be seriously impacted when any non-star station processor is powered down. Some noise may continue to be coupled via low impedance output of the power supplies to the transmitting amplifiers at the terminal processor. Such noise can be transmitted through the cable to the star coupler, and retransmitted to the other stations until detected as errors, slowing the processing rate of the entire system.

A similar problem arises when any station processor is physically disconnected from the star coupler. When a station is disconnected, the cable carrying the first and second transmission lines no longer has its shield grounded. As a result, spurious noise may be picked up by the wires and the normally grounded shield and conveyed to the receiving amplifier at the star coupler to be injected into the system and retransmitted.

SUMMARY OF THE INVENTION

It is an objective of this invention to provide an improved star coupler-type data processing system.

Another objective is to provide a data processing system having plural subsystems linked by a star coupler, with the system being provided with means for maintaining a low bit error rate of communication when any of the station processors remote from the star coupler but connected to the star coupler by cables are powered down, by providing means for isolating an amplifier at the transmitting terminal from noise sources.

Yet another objective is to provide a noise rejection circuit at the receiving amplifier at the star coupler connected to the incoming cable from a non-star station processor which is adapted to reject noise received by the star coupler amplifier when the remote processor is physically disconnected from the communication cable.

Another objective herein is to provide a circuit in a transmitter amplifier at a station processor which minimizes impact on the noise rejection capability of the star coupler when the transmitter is powered down. The circuit defines a virtual ground node at the transmitting amplifier, thereby isolating the transmitting amplifier from the system ground to which the transmission line cable shield and other grounded elements of the system are connected.

Another objective is to provide a circuit in the station processor's transmitting amplifier to maintain balanced differential transmission under normal conditions while maintaining the noise rejecting capability of the receiving amplifier at the star coupler when the station's transmitting amplifier is powered down.

A further objective herein is to provide a circuit at the receiver amplifier in the star coupler which establishes a noise rejecting offset voltage at the input to the star coupler receiver, so that the bit error rate is not impaired by disconnection of a non-star transmitter amplifier from the communication cable.

In summary, provided herein is a data processing system having a plurality of stations or terminals, each including a processor capable of transmitting messages to a star coupler through a shielded transmission line pair. The coupler includes means for connecting the messages from each system processor to every other system processor via a return transmission line pair. Each station processor drives its signals onto the transmission line wire pair in a differential mode using a pair of output transistors which switch to provide a differential signal output on the twisted pair. One side of the amplifier is connected to a bias voltage; the other side is coupled to a virtual ground, rather than system ground, to isolate the amplifier from potential transmission of noise which could result from coupling the amplifier to a common system ground with the cable shield, power supply, and the like. This virtual ground is defined by providing a second bias voltage supply connected through a current limiting resistor to the anodes of a pair of matched diodes. The first of the pair of diodes is connected to the system ground; the second diode is connected to the side of the amplifier which is to be at ground potential. The virtual ground is defined at the amplifier connection point because the second diode is selected to have a voltage drop equal to the drop across the first diode.

To maintain the noise rejection properties of the transmitting amplifier, the outputs of the switch transistor pair connected to the twisted wire pair of the outgoing transmission line are also connected to the first bias voltage source through matched impedance networks. Each impedance network consists of the series combination of a resistor and a diode. The resistance and dynamic impedance of the diode in each series combination are equal so no offset in the differential output signal is created.

The amplifier at the star coupler which receives the signals from the subsystem processor is of substantially the same design as that at the transmitter, and is coupled between a third bias voltage supply and system ground. The twisted wire pair is connected to the input of a pair of switching transistors which couple the signal from the transmission line pair into the star coupler. A series resistive network is connected from this third bias voltage source to ground, including a resistor coupled across the twisted wire pair and across the inputs to the two switching transistors of the receiver amplifier. This resistor is selected to have a resistance matching the characteristic impedance of the cable. Two further resistors are provided connected in series between each wire of the twisted pair and an input to the switched transistor pair; these resistors are of substantially the same value as the resistor connected across the switch transistor pair inputs. The series resistance network is completed by two high valued resistors connected from the switch transistor pair inputs to the third bias voltage source and ground. In this way, the three resistors of substantially the same value provide an offset voltage across the input to the switch transistor pair which rejects noise which could otherwise be fed into the inputs of the switched transistor pair when the transmission line cable is disconnected from the remote terminal or station. Selecting the resistors to have relatively low matched resistance values prevents creating of an offset voltage which could modify the differential input signals carried from the twisted wire pair to the switch transistor pair during normal signal transmission operation.

The objects and advantages of this invention will become more apparent when taken in conjunction with the following description and the attached drawings.

BRIEF DESCRIPTION OF THE DRAWINGS

FIG. 1 is a simplified block diagram illustrating a data processing system having plural subsystems each incorporating an independent processor linked to a star coupler in accordance with this invention;

FIG. 2 is a detailed schematic diagram of the transmitting amplifier provided at each subsystem to transmit signals through a shielded twisted wire pair to the star coupler;

FIG. 3 is a detailed schematic diagram of a receiver amplifier at the star coupler including the noise offset voltage circuit of this invention coupled to the shielded twisted wire pair which runs from each remote terminal or station to the coupler.

DESCRIPTION OF A PREFERRED EMBODIMENT

Referring first to FIG. 1, there is shown in general form a data processing system 10 having a plurality of terminals or stations 12 linked by bi-directional communication channels 14 to a star coupler 16 in accordance with this invention. The stations 12 are numbered 1 through M; they communicate with the star coupler 16 over channels 14 comprising first and second serial transmission lines. Each transmission line comprises a twisted wire pair 18 adapted for differential signal transmission, and protected by a grounded shield 20. The shield is connected to a ground 22 which comprises the lowest potential point in the system. Each bi-directional channel 14 has a first transmission line to carry a serial signal or message generated by its processor at the station 12 to the star coupler 16, and a second transmission line to carry a serial signal or message from the star coupler 16 back to its associated subsystem.

In accordance with technology well known in this field and described in detail in the incorporated Patents, any message transmitted and carried along one of the first transmission lines from a station processor transmitter 24 to a receiver 26 of a star coupler 16 is passed to every second transmission line through the transmitters 28 at star coupler 16 to all the stations 1 through M in the system 10 including the station or subsystem transmitting the message. As will be seen in FIGS. 2 and 3, each of the transmitters 24 and receivers 30 comprise a differential amplifier for providing the necessary differential signal transmission.

As known in this technology and described in the incorporated Patents, the function of the star coupler 16 is to connect all processors of stations 1 through M together for interprocessor communication. This is accomplished by taking the signals transmitted from the transmitters 24 of each station, and received at the receivers 26 of the coupler, and logically ORing all the signals received at the star coupler 16 in a common linking means (not shown). The resulting output signal is redriven over separate transmitters 28 over the second transmission line wire pair to station processors via receivers 30.

The problem presented by this direct couple transmission mode is the potential for high bit error communication rates when any station processor is powered down, or physically disconnected from the star coupler 16.

Typically, in star coupled systems such as are known in this technology, the shield 14 of the cable, any power supply, the transmitter 24 and receiver 30 at each station and all transmitters 28 and receivers 26 at the star coupler are coupled to a common ground 22. When a given station processor is powered down, extraneous noise may be picked up from the power supply or the like, and presented to the outgoing transmission line wire. In the absence of suitable preventive measures, this noise may be picked up at the receiver 26 of the star coupler 16 which remains active and connected to the communication channel 14, applied to the linking OR means and broadcast throughout the system.

Referring to FIG. 2, to eliminate this problem, a circuit 40 comprising especially to voltage source VCC 3 and a pair of diodes, D1, D2 has been provided to define a virtual ground coupled to one side of the transmitter differential amplifier 24. The other side of the transmitter differential amplifier 24 is connected to a bias voltage supply VNEG to provide the necessary bias voltages to the transmitter. By providing this virtual ground circuit 40, the transmitter 24 is isolated from the common ground of the remainder of the system, cutting off the most common source of noise in this system that exists when the station terminal processor is powered down.

The differential amplifier 24 itself includes a pair of output transistors Q6, Q7, coupled to the transmission line wires 18 for driving differential signals on this transmission line to the star coupler 16. The output date received on data lines IN1, IN2 is coupled through a differential pair of switches Q3, Q4 to the base of the transistors Q6, Q7. The transistor Q6, Q7 base current is defined by the resistors R6, R7 coupled between the differential switch pair Q3, Q4 and the virtual ground point 50 defined by network 40, so that the transistors are always conducting. Transistor Q5 comprises a constant current source which provides the reference point for the differential transistor pair Q3, Q4; the transistors Q1, Q2 comprise a circuit for defining a reference voltage bias for the switching transistor pair Q3, Q4. These transistors switch depending on which one is more positive than the other, with the threshold point being set by the transistors Q1, Q2; the threshold point may be modified by selection and adjustment of resistors R2, R3, R4. The diode D3 is included to provide for temperature compensation of the reference bias circuit. Resistors R5 and R8 are standard biasing resistors.

The circuit 40 for defining a virtual ground at one side of the differential amplifier comprises a voltage source VCC3 which is typically +5 volts coupled through a voltage dropping resistor R1 to a pair of matched diodes D1, D2. In this preferred embodiment, the resistor R1 is selected so that the voltage at the node 60 is about 0.7 to 0.8 volts. Thus the voltage drop across D1 to ground is about 0.8 volts. This voltage drop is matched by selecting a matched diode D2; as a result, the node 50 is now held at a reference level equal to the ground level of the system as a whole, without a direct feed-through connection of the node 50 to system ground 22. As a result, the output transistor pair Q6, Q7 which drives the differential signal on the twisted pair 18 is effectively isolated from spurious noise signals which may be coupled through the system ground.

Capacitors C1 and C2 in the virtual ground network 40, and capacitors C4, C5 of the transistor differential amplifier serve the purpose of filtering high and low frequency noise.

Another problem to be addressed in the non-star terminals when they are powered down is the potential for noise being fed back through the power supply through the pulldown resistors R9, R10 to the twisted pair 18. To address this problem, balanced differential networks 70, 72 are provided coupled between the emitter outputs of transistors Q6, Q7 and bias voltage supply line VNEG. The resistors R9, R10 must be provided because the switched output transistor pair Q6, Q7 is always turned on slightly, drawing a slight current through R6, R7. Because of this conductive state, and the high capacitance of the transmission channel 14, the resistors R9 and R10 are provided, connected from the output emitters of the two transistors Q6, Q7 to bias voltage supply line VNEG, to pull down this capacitance. To prevent noise being fed back through the power supplies through these resistors into the twisted pair, diodes D5, D6 have been provided in series with the pull-down resistors R9, R10. The diodes have a small forward impedance of about 50 ohms so that they offer small forward impedance in normal operation, and do not effect normal transmission. They are also selected so that the total dynamic impedance presented by each of the balanced impedance networks 70, 72 are equal. That is, the total dynamic impedance presented by the series combination of resistor R9 and diode D5 is equal to the total dynamic impedance presented by the series combination of resistor R10 and the diode D6. As a result, no feedback path for the noise at the bias voltage supply line VNEG into the twisted pair 18 is available when the remote station is powered down.

Referring to FIG. 3, a further noise problem which must be addressed in a star-coupled communication system arises when any station processor 12 is disconnected from its cable. This may occur if the station processor is being repaired or the like. In this case, noise may be picked up by the free end of the cable, and passed through receiver differential amplifier 26. Specifically the noise signals would be picked up by the differential amplifier switch pair Q8, Q9, and coupled to the differential output stage comprising transistors Q11 and Q12. The presence of decoupling capacitors C6, C7 is not sufficient to screen out this noise. Therefore, a series resistance network has been added according to the present invention comprising a series of resistors R11, R12, R13, R14, R15 connected between system ground 22 and the bias voltage supply line $VNEG^2$. The use of the virtual ground circuit 40 at the transmitter cabinet allows this resistive network to be added at the star coupler cabinet running from system ground 22 to an independent bias voltage supply line VNEG. Without the use of the virtual ground circuit 40 at the station terminal, this series resistance network would effectively appear in parallel across the output transistor connection of R7-Q6 (FIG. 2) and R6-Q7.

Preferred values of these resistors are as follows:
R13—100 ohms
R12—100 ohms
R14—100 ohms
R11—3.9k ohms
R15—8.2k ohms These resistors are selected and connected to provide a noise rejection offset circuit which will maintain the minimum signal-to-noise ratio which is necessary for this system. Such noise offset circuit is especially important in a star-coupled configuration where if one terminal 12 is pulled out of the system, noise generated at the free cable end can be picked up, and retransmitted through the amplifier in the receiver 26 at the star coupler to all the other stations in the system.

The resistor R13 has a value of 100 ohms which is selected to match the characteristic impedance of the cable (about 96–100 ohms). Due to this matching, the quality of the differential signal applied to the differential amplifier comprising transistors Q8, Q9 is not effected by this resistive network. Resistors R12 and R14 are provided connected in series between the ends of the wires and the inputs to transistors Q8 and Q9, to cooperate with resistor R13 to provide a sufficiently high offset voltage across the input terminals of the receiver differential amplifier. By providing these resistors R12, R14, offset appears in the differential signal which is being applied to the input transistor pair Q8, Q9 of the differential amplifier of the receiver. Resistors R11 and R15 are of higher value, providing the necessary connections between a bias voltage source and ground without attenuating the input signal from the transmission wire pair 18. The remainder of the circuit of FIG. 3 is of similar design to that of FIG. 2, comprising a differential amplifier switched transistor pair Q8, Q9 which receives the signals from the wires 18. The state of the transistors Q8 and Q9 depend on which transistor has a signal applied to its base more positive than a current reference signal received on its emitter from the current reference transistor Q10. Transistor Q10 in turn is driven by a reference voltage which is provided by the circuit comprising transistors Q13 and Q14 and resistors R19, R20, R21 and R22 which cooperate with diode D7 to provide a low impedance emitter follower reference voltage signal which can be fed to the base of Q10. Temperature compensation is provided by the diode D7. The resistor R18 is a standard biasing resistor. Resistors R16 and R17 are provided connected between the bases of the output stage transistors Q11 and Q12 and system ground to draw a small amount of base current to prevent these transistors from shutting off completely at any point during the switching cycle.

In view of the foregoing, it will be understood that the present invention provides a star coupler configured communication network capable of screening out sources of noise, and eliminating or minimizing the higher bit error rates which typically occur when any station processor 12 is powered down, or when any station processor is physically disconnected from the star coupler. This is achieved by providing a virtual ground node at the transmitter amplifier of each station processor, effectively isolating the output transistor pair from the system ground and thus from sources of noise; by providing a balanced differential network in series between the output terminal of each output transistor and the bias voltage supply to prevent feedback of any signal noise through the pulldown resistors which are tied to the transmission wire pair; and by providing a series resistive network across the input to the receiver differential amplifier at the star coupler end of the twisted wire pair for setting up an offset voltage which screens out signal noise in the event a station processor is disconnected from the communication channel. The present preferred embodiment has been described above. However, it should be appreciated that within the purview of the present invention, various changes may be made within the scope of the following claims.

What is claimed:

1. In a star-configured communications network having a plurality of terminals, a star coupler, and a plurality of bidirectional communication channels coupled between said star coupler and respective ones of said terminals for transferring data to and from said terminals, each of said channels comprising a shielded cable having a first transmission line for carrying signals from one of said terminals to said star coupler, and a second transmission line for carrying signals from said star coupler to said one terminal, each of said transmission lines comprising a pair of signal wires connected for differential signal transmission between said star coupler and said one terminal, said transmission lines being surrounded by a shield connected to a system ground, each of said terminals comprising differential amplifier means connected to said wires of said first transmission line for transmitting signals on said first transmission line, an improved means for providing noise isolation in said network comprising a first bias voltage source for biasing said differential amplifier means, and means for defining a virtual ground that is at the same potential level as said system ground but is electrically isolated from said system ground, said differential amplifier means connected between said first bias voltage means and said means for defining a virtual ground whereby noise rejection of said star coupler is maintained in the absence of signal transmission from said terminals by isolating said differential amplifier means from said system ground.

2. A communication network as in claim 1 wherein said differential amplifier means comprises:
   a pair of output transistors coupled to said transmission line signal wires for transmitting differential signals over said signal wires;
   means for supplying data signals to aid differential amplifier means;
   signal means for coupling said data signals to said pair of output transistors; and
   biasing means for supplying a temperature compensated bias voltage to said signal means for coupling data signals, said biasing means being coupled between said first bias voltage source and said means for defining virtual ground, base terminals of said output transistors being coupled to said signal means for receiving said data signals and through loan resistors to said means for defining virtual ground, to isolate the data signal input from said virtual ground.

3. A communication network as in claim 2 wherein said means for defining virtual ground comprises a second voltage source, a first diode coupled between said second voltage source and said system ground and having a defined voltage drop and second diode coupled to said differential amplifier means and having a forward defined voltage drop matched to the voltage drop of said first diode, whereby the potential at a cathode of said second diode is substantially ground but said amplifier means are not tied to said system ground.

4. A communication network as in claim 3 wherein said output transistors are connected to said system ground to which the shield is connected so that signals on said cable are referenced to the potential level of shield ground.

5. A communication network as in claim 2 wherein each of said output transistors includes in addition to said base terminal connected to said signal means for receiving said data signals,
   a collector terminal connected to said system ground, and an emitter terminal connected to one of said wires for transmitting signals on said wire to said star coupler,
   said emitter terminal of each of said output transistors being connected to said first bias voltage source through separate, balanced impedance networks, each impedance network including a diode polarized to prevent noise feedback to said wires when said terminal is powered down.

6. A communication network as in claim 5 wherein each of said impedance networks comprises a resistor in series with said diode between said transistor emitter terminal and said first bias voltage source, said diode being selected so that the total resistance plus diode dynamic impedance of said impedance networks are equal.

7. A communication network as in claim 3 further comprising:
capacitors connected between said first bias voltage source and said virtual ground and said second voltage source and said system ground.

8. A communications network as in claim 1, wherein said means for defining a virtual ground includes a diode connected between said system ground and said virtual ground for preventing current flow in the direction from said virtual ground to said system ground.

9. In a star-configured communications network having a plurality of terminals, a star coupler, and a plurality of bidirectional communication channels coupled between said star coupler and respective ones of said terminals for transferring data to and from said terminals, each of said channels comprising a shielded cable having a first transmission line for carrying data from one of said terminals to said star coupler, and a second transmission line for carrying data from said star coupler to said one terminal, each of said transmission lines comprising a pair of signal wires connected for differential signal transmission between said star coupler and said one terminal, said transmission lines being surrounded by a shield connected to a system ground, differential amplifier means having two inputs coupled to said transmission line signal wires at said star coupler for amplifying said data received at said star coupler on said first transmission line, a bias voltage source connected to one side of said differential amplifier, said system ground being connected to the other side of said differential amplifier, and noise rejection means for establishing a noise offset voltage at said two differential amplifier inputs comprising a resistor network connected from said bias voltage source across said two differential inputs and to said system ground, whereby a noise offset level voltage is established at said differential amplifier inputs greater than typical signal noise received on said transmission line signal wires consistent with a desired signal-to-noise ratio.

10. A communication network as in claim 9 wherein said resistor network comprises: a first resistor coupled across said differential amplifier inputs and having a value about equal to the characteristic impedance of the cable, and second and third resistors of significantly higher value than said first resistor connected between one of said differential amplifier inputs and said bias supply source and another of said differential amplifier inputs and said system ground, whereby the signals-to-noise ratio of said star coupler is not affected by disconnection of one of said cables from said communication channel running to said star coupler.

11. A communication network as in claim 10 wherein said resistor network further comprises fourth and fifth resistors each of substantially the same value as said first resistor and each connected in series between one of said differential amplifier inputs and one of said transmission line signal wires, thereby maintaining the signal to said differential amplifier inputs.

* * * * *

UNITED STATES PATENT AND TRADEMARK OFFICE
CERTIFICATE OF CORRECTION

PATENT NO. : 4,856,023
DATED : August 8, 1989
INVENTOR(S) : Amar J. Singh

It is certified that error appears in the above-identified patent and that said Letters Patent is hereby corrected as shown below:

Column 8, line 19, delete "aid" and substitute --said--.

Column 8, line 30, delete "loan" and substitute --load--.

Column 8, line 37, after the word "drop" insert --,--.

Column 8, line 37, after the word "and" insert --a--.

Signed and Sealed this

Twenty-ninth Day of May, 1990

Attest:

HARRY F. MANBECK, JR.

*Attesting Officer*  *Commissioner of Patents and Trademarks*